United States Patent
Callaghan et al.

(10) Patent No.: US 9,544,374 B2
(45) Date of Patent: *Jan. 10, 2017

(54) RELATIVE TIMESTAMP WHEN REAL TIME CLOCK IS UNAVAILABLE

(71) Applicant: Microsoft Technology Licensing, LLC, Redmond, WA (US)

(72) Inventors: David Callaghan, Kirkland, WA (US); Sergey Karamov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/609,698

(22) Filed: Jan. 30, 2015

(65) Prior Publication Data
US 2015/0207886 A1 Jul. 23, 2015

Related U.S. Application Data

(63) Continuation of application No. 13/470,699, filed on May 14, 2012, now Pat. No. 8,972,607, which is a
(Continued)

(51) Int. Cl.
*G06F 15/173* (2006.01)
*H04L 29/08* (2006.01)
(Continued)

(52) U.S. Cl.
CPC ............ *H04L 67/142* (2013.01); *G06F 1/14* (2013.01); *H04L 41/0686* (2013.01); *H04L 67/1095* (2013.01)

(58) Field of Classification Search
CPC ............ H04L 2012/5636; H04L 47/10; H04L 47/122; H04L 65/1069; H04L 65/1093; G06F 1/04; G06F 1/14
(Continued)

(56) References Cited

U.S. PATENT DOCUMENTS

| 5,896,524 A * | 4/1999 | Halstead, Jr. ............. G06F 1/12 713/375 |
| 6,772,361 B1 | 8/2004 | Walsh |

(Continued)

FOREIGN PATENT DOCUMENTS

| CN | 1784841 A | 6/2006 |
| CN | 101047434 A | 10/2007 |
| CN | 101431438 A | 5/2009 |

OTHER PUBLICATIONS

Prosecution History for U.S. Appl. No, 13/077,011 including: Issue Notification dated Feb. 25, 2015, Notice of Allowance dated Nov. 13, 2014, Amendment dated Oct. 16, 2014, Non-Final Office Action dated Jul. 16, 2014 and Application and Drawings filed Mar. 31, 2011, 57 pages.

(Continued)

*Primary Examiner* — Ruolei Zong
(74) *Attorney, Agent, or Firm* — John Jardine; Dan Choi; Micky Minhas

(57) ABSTRACT

An operating system or other software resident on an electronic processing device employs aggregated timestamps. In this way timestamps can be generated and compared to one another without the need for a real-time clock with a power backup. Aggregated time includes the last known time that the device synchronized its clock with a reference time available over a network. Aggregated time also includes a relative time value which in part accumulates using a session clock whenever the device is powered-up. When network time becomes available the operating system or other software will use this information to fix up the already generated aggregated timestamps. A comparison of timestamps will most of the time be resolved for stamps generated on the same device and will generally be resolved (Continued)

by comparing time frames when the timestamps being compared are generated by different devices.

21 Claims, 4 Drawing Sheets

Related U.S. Application Data continuation of application No. 13/077,011, filed on Mar. 31, 2011, now Pat. No. 8,984,168.

(51) Int. Cl.
    *H04L 12/24*     (2006.01)
    *G06F 1/14*     (2006.01)

(58) Field of Classification Search
    USPC .... 709/248, 224; 340/3.1–3.2; 370/498, 503
    See application file for complete search history.

(56) References Cited

U.S. PATENT DOCUMENTS

| | | | | |
|---|---|---|---|---|
| 7,765,316 | B1* | 7/2010 | Huckins | H04L 12/1881 709/203 |
| 8,972,607 | B2 | 3/2015 | Callaghan et al. | |
| 8,984,168 | B2 | 3/2015 | Callaghan et al. | |
| 2002/0001258 | A1 | 1/2002 | Kim | |
| 2006/0212508 | A1* | 9/2006 | Deguchi | G06Q 30/02 709/200 |
| 2008/0168565 | A1* | 7/2008 | Reinikainen | G06F 21/10 726/26 |
| 2009/0158075 | A1* | 6/2009 | Biberstein | G06F 1/12 713/375 |
| 2009/0193282 | A1 | 7/2009 | Siemens et al. | |
| 2010/0188255 | A1 | 7/2010 | Cornwall | |
| 2013/0176828 | A1 | 7/2013 | Farmer | |

OTHER PUBLICATIONS

Prosecution History for U.S. Appl. No. 13/470,699 including: Issue Notification dated Feb. 11 2015, Notice of Allowance dated Oct. 30, 2014, Terminal Disclaimer Review Decision dated Oct. 21, 2014, Amendment After Final dated Oct. 20, 2014, Terminal Disclaimer dated Oct. 20, 2014, Final Office Action dated Sep. 16, 2014, Amendment dated Jun. 13, 2014, Non-Final Office Action dated Feb. 13, 2014 and Application and Drawings filed May 14, 2012, 80 pages.
Kuhn, Markus, "IBM PC Real Time Clock should run in UT", Retrieved at <<http://www.cl.cam.ac.uk/~mgk25/mswish/ut-rtc.html>>, Mar. 17, 2010, pp. 7.
"Time-An important Subject with any OS", Retrieved at <<http://www.markus-gattol.name/ws/time.html>>, Oct. 1, 2010, pp. 27.
"High Resolution Timers", Retrieved at <<http://export.writer.zoho.com/public/rreginelli/Chapter-5—High-Resolution-Timers-R21/fullpage>>, Retrieved Date: Nov. 1, 2010, pp. 8.
"About the RTX51 Real-time Operating System", Retrieved at<<http://www.iee.put.poznan.pl/zaklady/zneie/materialy/brock/8051/rtx51.pdf>>, Retrieved Date: Nov. 1, 2010, pp. 18.
"First Office Action and Search Report Issued in Chinese Patent Application No. 201210090374.8", Mailed Date: Jun. 20, 2016. 12 Pages.
"Second Office Action Issued in Chinese Patent Application No. 201210090374.8", Mailed Date: Nov. 16, 2016, 9 Pages.

* cited by examiner

RELATIVE TIMESTAMP WHEN REAL TIME CLOCK IS UNAVAILABLE

CROSS-REFERENCE TO RELATED APPLICATION

The present application is a continuation of and claims priority of U.S. patent application Ser. No. 13/470,699, filed May 14, 2012, which is a continuation of U.S. patent application Ser. No. 13/077,011 filed Mar. 31, 2011, the contents of these applications are hereby incorporated by reference in their entirety

BACKGROUND

A typical personal computer (PC) and other embedded devices such as mobile phones include two time keeping systems: a hardware real time clock (RTC), and a software virtual clock maintained by an operating system. The RTC typically includes a battery backup source of electrical power for the purpose of maintaining accurate time of day information while the device is turned off or the main power is disconnected. In this way the RTC continuously maintains an estimate of the current date and time. The software virtual clock is typically synchronized to the RTC during PC power up and initialization (i.e., during operating system boot up).

These devices commonly adjust their reference time when a trusted remote time source becomes available. Many different time synchronization systems exist for synchronizing computer system time clocks over networks (e.g., the Internet). Examples of such network time synchronization systems include the network time protocol (NTP) and the related simple network time protocol (SNIP). Time synchronization software executed by the PC or other device typically provides periodic time synchronization of an RTC to an external time source. The time synchronization software may also track RTC timekeeping errors and adjust programmable RTC timekeeping circuits to improve RTC timekeeping accuracy between periodic time synchronizations.

The need for an RTC and backup power supplies increases the overall cost of the device and can limit device reliability since it depends on components with fixed lifespans. In addition, the backup power supply may include hazardous materials within the batteries. While normal phone batteries can be removed for recycling, systems containing backup batteries often need to be disassembled to recover the hazardous materials.

SUMMARY

In one implementation, an operating system or other software resident on an electronic processing device employs aggregated timestamps. In this way the timestamps can be generated and compared to one another without the need for a real-time clock with a power backup. Aggregated time includes the last known time that the device synchronized its clock with a reference time available over a network. Aggregated time also includes a relative time value, which in part accumulates using a session clock whenever the device is powered-up. When network time becomes available the operating system or other software will use this information to fix up the already generated aggregated timestamps by adding network time to it. The chronological order of events can be determined by a comparison of timestamps generated on the same device and will generally be resolved by comparing time frames when the timestamps being compared are generated by different devices.

This summary is provided to introduce simplified concepts for managing an immersive environment that are further described below in the Detailed Description. This summary is not intended to identify essential features of the claimed subject matter, nor is it intended for use in determining the scope of the claimed subject matter. Techniques and/or apparatuses for managing an immersive environment are also referred to herein separately or in conjunction as the "techniques" as permitted by the context.

DETAILED DESCRIPTION

As detailed below, methods and apparatuses are described to track the chronological order and issue timestamps of events that occur in a PC or other electronic processing device without the use of a RTC with battery backup. The technique assumes that a reliable network connection will be established at some point during the normal operation of the device. The technique can also be applied to maintain relative chronological order in devices which never establish a network connection.

The operating system or other software resident on the device employs the concept of aggregated time. Aggregated time includes the last known time that the device synchronized its clock with a reference time available over a network (referred to herein as "network time"). Aggregated time also includes a monotonic clock value to provide a relative time value. When network time becomes available the operating system or other software will use this information to fix up the already generated aggregated timestamps. A comparison of timestamps will generally be resolved for stamps generated on the same device and will be resolved b; comparing time frames when the timestamps being compared are generated by different devices.

Three aspects of aggregated time will be discussed. The first aspect concerns the way in which aggregated time is generated or set. The second aspect concerns the way in which aggregated time is maintained over time once it has been set. The third aspect concerns the way aggregated time is used to compare timestamps that employ aggregated time. Each of these will be discussed in turn.

Aggregated time includes the following four fields: network time, power time, network interval, and system ID. The network time refers to the last time at which a reference time was registered by the device over a network to which it is in communication. A reference time is registered when a timestamp is generated while the reference time is available. Network time may be specified in accordance with any suitable reference, but as in the examples below, will often be in coordinated unit time (UTC) time units.

Power time refers to an amount of time that begins with a session following the last session in which network time last became unavailable and which accrues over one or more sessions during which the PC or other device is powered up. A session refers to the time period between booting up and powering down the device. In accordance with this definition, the network time represents the actual current time when the power time is unset or equal to zero. In other words, the power time is unset or equal to zero whenever the network time is known.

Figure 1:
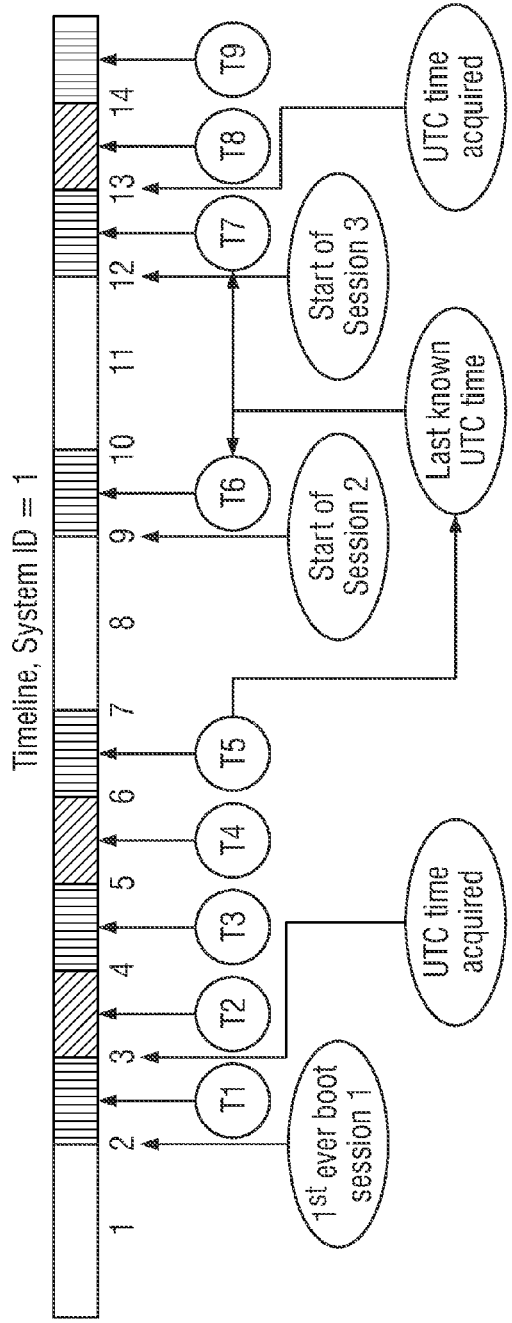
FIGS. 1 and 2 are timelines showing timestamps generated by two different electronic processing devices.

The network interval represents a time at which network time is acquired after a timestamp is made without reference to network time. The network interval is only set for timestamps that were generated when the network time is unavailable.

a device having a system ID equal to 1. In FIG. 1 nine timestamps T1-T9 are shown along a chronological timeline that begins at hour zero and ends at hour fifteen. Thus, for example, timestamp T1 is set at 2.5 hours and time stamp T7 is set at 12.5 hours. Also shown is the status of the device at each time along the timeline. In particular, the device is powered down between hours 0-2, 7-9 and 10-12. In addition, a reference time is available between hours 3-4, 5-6 and 13-14. At all other times a network is not available and thus a reference time is also not available.

The aggregated time is represented using the following notation: {network time, power time, network interval, system ID}.

TABLE 1

| CHRONOLOGICAL TIME | AGGREGATED TIME | COMMENTS |
| --- | --- | --- |
| Hour 2 | | First boot. The network was never acquired by the current device at any previous time |
| Hour 2.5 | T1 = {0, 0.5, 0, 1} | Since network time has not yet ever been acquired by the device, 0 represents absolute 0 (and not simply 0 hours on the same day). That is, network time can be treated as a value at some universal fixed time point in the past. |
| Hour 3 | | The network is acquired and time stamp maintenance is triggered for timestamps made when a reference time was unavailable. Timestamp maintenance is triggered for those timestamps having a power time greater than zero and a network interval equal to zero: In this case T1 needs to be fixed. T1 (fixed) = {0, 0.5, 3, 1} |
| Hour 3.5 | T2 = {3.5, 0, 0, 1} | |
| Hour 4.5 | T3 = {4.5, 0, 0, 1} | The absence of the network is irrelevant since network time has already acquired and is maintained by the session time clock in the device (which is only operational when the device is powered up) |
| Hour 5.5 | T4 = {5.5, 0, 0, 1} | |
| Hour 6.5 | T5 = {6.5, 0, 0, 1} | The absence of the network is irrelevant since reference time has already acquired and is maintained by the session time clock in the device |
| Hour 9.0 | | Second device boot to start session 2. The network is not available and the last registered network time is 6.5 hours, which is the time when the last timestamp was made |
| Hour 9.5 | T6 = {6.5, 0.5, 0, 1} | Power time added from time interval [9, 9.5] while network access is unavailable |
| Hour 12.0 | | Third device boot to start session 2. The network is still not available and thus network time remains at 6.5 hours |
| Hour 12.5 | T7 = {6.5, 1, 0, 1} | Power time added from time interval [12, 12.5] while network access is unavailable |
| Hour 13.0 | | The network (and thus the current reference time) is acquired, Timestamp maintenance is triggered for those timestamps having a power time greater than zero and a network interval equal to zero: T6 (fixed) = {6.5, 0.5, 13, 1} -Network Interval is set T7 (fixed) = {6.5, 1, 13, 1} -Network Interval is set |
| Hour 13.5 | T5 = {13.5, 0, 0, 1} | |
| Hour 14.5 | T9 = {14.5, 0, 0, 1} | |

The final field in the aggregated time is the system ID, which is a unique identifier of the physical device on which the time stamp was made.

Given the above definitions of the various components of aggregated time, the manner in which timestamps are generated or set in terms of the aggregated time will be described with reference to the timeline shown in FIG. 1 for As seen in Table 1, aggregated timestamp maintenance is performed whenever a network is available to provide a reference network time. At these times maintenance is performed to update any timestamps having a power time that is not set to zero. The network interval is set to the newly acquired reference time (while the network time remains set to the previously acquired reference time).

Figure 2:
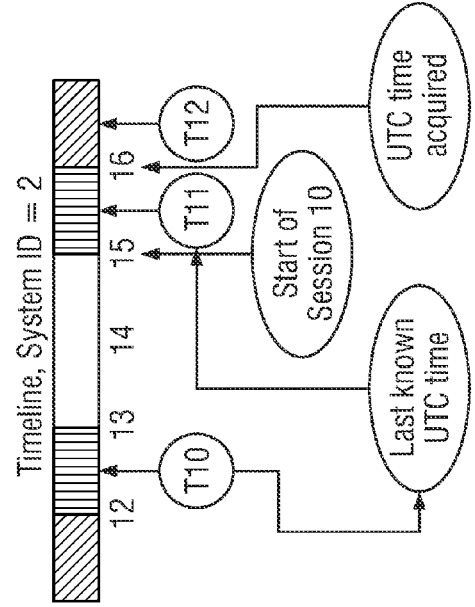

FIG. 2 is timeline for a device having a system ID equal to 2. In FIG. 2 three timestamps T10-T12 are shown along a chronological timeline that begins at hour eleven and ends at hour seventeen. Similar to the manner in which the aggregated time values were determined for the timestamps of FIG. 1, the aggregated time values for FIG. 2 is as follows:

T10={12.5, 0, 0, 2}
T11={12.5, 0.5, 0, 2}
T11 (fixed)={12.5, 0.5, 16.2}
T12={16.5, 0, 0, 2}

In order to compare timestamps to one another, three different cases need to be considered. In the first case the power time is not set (e.g., is equal to zero). In this case the network time is the same as the current reference time. This will be true whether the timestamps are created on the same device or different devices. Thus, with reference to the timestamps in FIGS. 1 and 2, timestamp T3 occurs later in time than timestamp T2 because the network time is greater for T3. Likewise, timestamp T9 (stamped on device 1) is occurs later than timestamp T10 (stamped on device 2) because the network time is greater for timestamp T9.

The second case arises when either of the timestamps being compared has the power time set (i.e., nonzero) and are made on the same device (i.e., when the system IDs in the aggregated times are the same). Once again, under these circumstances, the value of the network time resolves the comparison. If the values of the network time for both timestamps are the same, the power time will resolve the comparison. For instance, referring again to the timestamps in FIGS. 1 and 2: T6 occurs later than T4 because the network time is greater for T6; T8 occurs later in time than T6 because the network time is greater for T8; T6 occurs later in time than T1 because the network time is greater for T6; T6 occurs later than T1 (fixed) because the network time is greater for T6; and T7 occurs later in time than T6 because, although they have the same network time, the power time is greater for T7.

The third and last case arises when at least one of the power times is set, but the two timestamps being compared have different values for the system ID. That is, the timestamps were generated on two different devices. In order to compare two timestamps under these circumstances the concept of a timeframe is introduced. Each aggregated timestamp is associated with a timeframe and represents a reference time interval during which the timestamp was made. If the power time is not set (e.g., equal to zero), the timeframe has a single value which is equal to the network time of the aggregated timestamp. If on the other hand the power time is set (e.g., not equal to zero), then the timeframe represents a time interval between an earlier time and a later time. The earlier time is equal to a sum of the network time and the power time for the aggregated timestamp and the later time is equal to current time if the network interval for the aggregated timestamp is zero or the later time is equal to the network interval for the aggregated timestamp if the network interval is not equal to zero.

In this third case (i.e. power time for at least one of the first and second aggregated timestamps is nonzero and the device IDs are different), the two timeframes associated with the aggregated timestamps are compared. In particular, if the first and second timeframes do not overlap, the aggregated timestamp having a later timeframe occurs later in time. However, if the two timeframes do overlap, then the comparison cannot be resolved and remains inconclusive. This is expected to happen statistically rarely and does not reflect any deficiency of the method; the information in this case is genuinely unavailable, because when the two timeframes overlap there is no way to tell whether an event that took place inside one timeframe was before or after the event that took place inside the other timeframe.

Table 2 shows the timeframes that are associated with the aggregated timestamps T1-T12 from FIGS. 1 and 2.

TABLE 2

| AGGREGATED TIME | TIMEFRAME | COMMENT |
| --- | --- | --- |
| T1 = {0, 0.5, 0, 1} | Timeframe = [0, CT] | |
| T1 (fixed) = {0, 0.5, 3, 1} | Timeframe = [0, 3] | As before, 0 indicates that the reference time has never been set. (CT = Current Time) |
| T2 = {3.5, 0, 0, 1} | Timeframe = [3.5, 3.5] | The frame indicates exact time |
| T3 = {4.5, 0, 0, 1} | Timeframe = [4.5, 4,5] | The frame indicates exact time |
| T4 = {5.5, 0, 0, 1} | Timeframe = [5.5, 5.5] | The frame indicates exact time |
| T5 = {6.5, 0, 0, 1} | Timeframe = [6.5, 6.5] | The frame indicates exact time |
| T6 = {6.5, 0.5, 0, 1} | Timeframe = [6.5 + 0.5 = 7, CT] | |
| T7 = {6.5, 1, 0, 1 } | Timeframe = [6.5 + 1 = 7.5, CT] | |
| T6 (fixed) = {6.5, 0.5, 13, 1} | Timeframe = [6.5 + 0.5 = 7, 13] | |
| T7 (fixed) = {6.5, 1, 13, 1} | Timeframe = [6.5 + 1 = 7.5, 13] | |
| T8 = {13.5, 0, 0, 1} | Timeframe = [13.5, 13.5] | The frame indicates exact time |
| T9 = {14.5, 0, 0, 1} | Timeframe = [14.5, 14.5] | The frame indicates exact time |
| T10 = {12.5, 0, 0, 2} | Timeframe = [12.5, 12.5] | The frame indicates exact time |
| T11 = {12.5, 0.5, 0, 2} | Timeframe = [12.5 + 0.5 = 13, CT] | |
| T11 (fixed) = {12.5, 0.5, 16, 2} | Timeframe = [12. + 0.5 = 13, 16] | |
| T12 = {16.5, 0, 0, 2} | Timeframe = [16.5, 16.5] | The frame indicates exact time |

Based on the timeframes shown in Table 2, the following two illustrative timestamps comparisons can be resolved. In the first example, T6 (fixed) occurs later in time than T11.

This is because the timeframes [7, 13] and [13, CT] do not overlap and the timeframe [7, 13] occurs before the timeframe [13, CT]. In the second example timestamp T6 (fixed) is compared to timestamp T10. The results of this comparison are inconclusive because the timeframe [12.5, 12.5], which is associated with timestamp T6 (fixed) overlaps with timeframe [7, 13], which is associated with timestamp T10.

Figure 3:
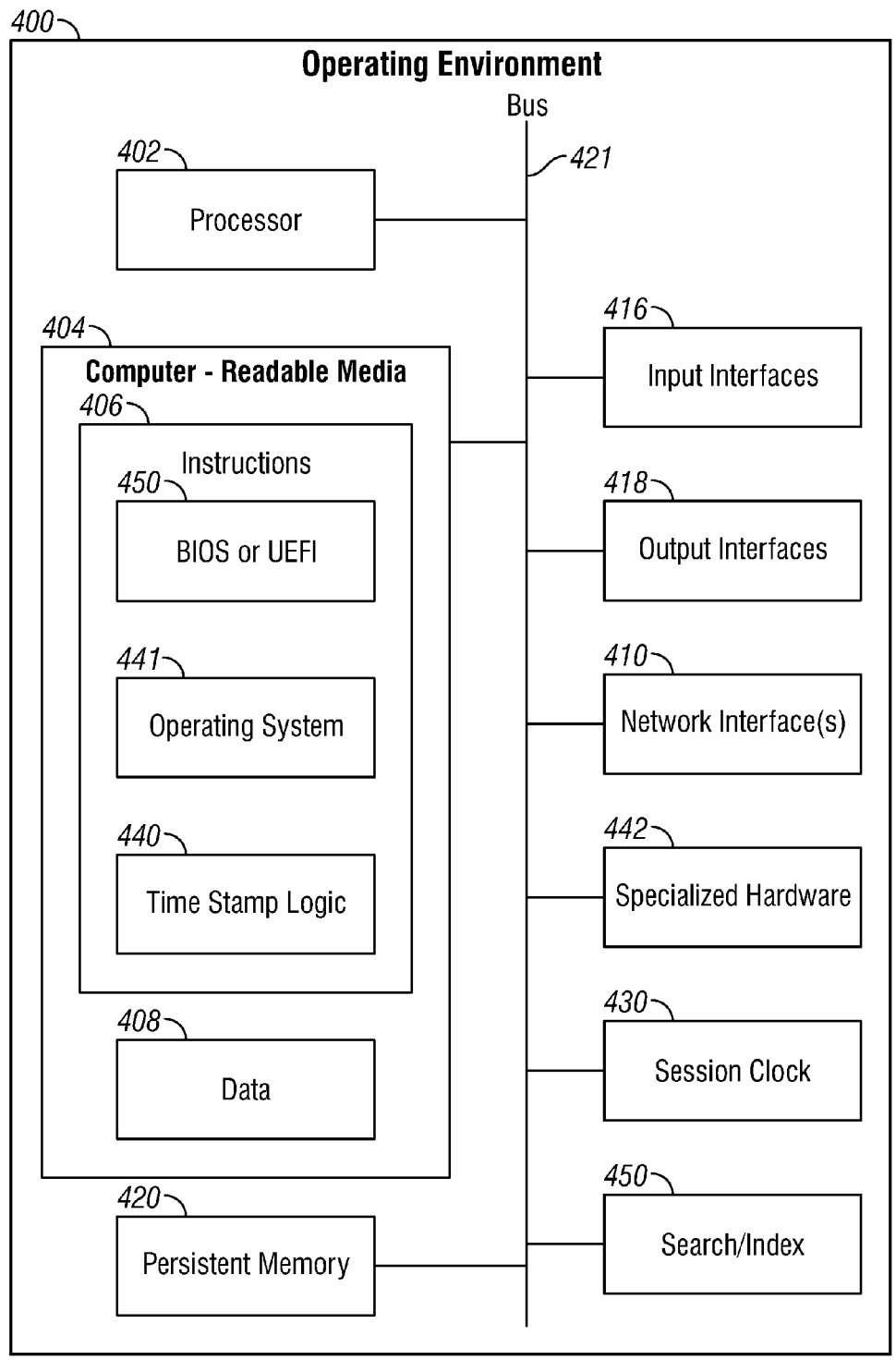
FIG. 3 is a simplified block diagram of an exemplary electronic processing device in which aggregated timestamps may be used.

FIG. 3 is a simplified block diagram of an exemplary electronic processing device 400 in which aspects of the timestamp techniques described above may be implemented or used. Electronic processing device 400 is generally indicative of a wide variety of genera-purpose or special-purpose computing environments and is not intended to suggest any limitation as to the scope of use or functionality of the system(s) and methods described herein. For example, electronic processing device 400 may be a consumer electronic device such as a mobile phone, a personal digital assistant, a personal computer, a personal media player, a computer, television device, a set-top box, a hard-drive storage device, a video camera, a DVD player, a cable modem, a local media gateway, or another type of known or later developed electronic device. Electronic processing de ice 400 may also be a type of networked server, or any aspect thereof. Such a server may be part of a distributed computing network, and may be used to implement, host, or proxy any type of network-based service in whole or in part.

As shown, electronic processing device 400 includes processor 402, computer-readable media 404, and computer-executable instructions 406. One or more internal buses 421 may be used to carry data, addresses, control signals, and other information within, to, or from electronic processing device 400 or elements thereof.

Processor 402, which may be a real or a virtual processor, controls functions of the operating environment by executing computer-executable instructions 406. The processor may execute instructions at the assembly, compiled, or machine-level to perform a particular process.

Computer-readable media 404 may represent any number and combination of local or remote devices, in any form, now known or later developed, capable of recording, storing, or transmitting computer-readable data such as computer-executable instructions 406 and data 408. In particular, computer-readable media 404 may be, or may include, a semiconductor memory (such as a read only memory ("ROM"), any type of programmable ROM ("PROM"), phase change memory (PRAM), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof.

Computer-executable instructions 406 represent any signal processing methods or stored instructions. Generally, computer-executable instructions 406 are implemented as software components according to well-known practices for component-based software development, and encoded in computer-readable media. Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

Computer-executable instructions 406 includes such components as a basic input/output system ("BIOS") or Unified Extensible Firmware Interface (UEFI) 450 for booting and/or controlling low-level operation of device 400. The computer-executable instructions 406 also include an operating system 441 for controlling the operation of electronic processing device 400. The operating system may include, or interface with a Java or .NET virtual machine module that enables control of hardware components and/or operating system operations via Java or Managed (C#, Silverlight) application programs. Computer-executable instructions 406 further includes timestamp logic 440, which can be utilized by the device 400 for calculating, maintaining and comparing aggregated timestamps as described above. In some implementations the timestamp logic 440 may be incorporated directly into the operating system 441.

The time stamp logic component 440 can contain an application that provides a service to the operating system for the purpose of converting events with power time stamps such as events T11 and T7 shown in FIG. 1 to an actual time of day time stamp after network time (e.g., UTC) is acquired from the network. This scenario occurs for example when files are created or modified before the system has acquired the network time. These files would contain a created file timestamp that is an Aggregated Time value that cannot be compared fir chronological order against files from outside the system that do not support Aggregated time. Thus the system can convert files from Aggregated Time to time of day as a background task. The time stamp logic can be invoked to convert files with Aggregated Time that can be fixed up into actual time of day when they are copied off the system. For example if a remote client computing requested a file from the device over the network interface 410, the file would be fixed up from Aggregated Time to time of day (assuming it could be fixed up) using standard network file transfer protocols such as but not limited to FTP (File Transfer Protocol), SMB (Server Messaging Block), NFS (Network File System) protocols to stream the file. The remote client would receive the file and associated metadata with regards to date and timestamp information associated with the file in standard conventional file timestamp formats.

The time stamp logic can also serve to assist indexing or search engines component 460 to determine the chronological ordering of the files in the system. For example the user may wish to find all files created between a certain date and time such as after Jan. 1, 2011 12:00 PM but before Mar. 15, 2011 at 1:00 PM. The Search engine can examine files only stamped with Aggregated Time and determine which windows of time enclosed by actual network time are applicable to the search parameters. Thus the system can return files and information created during the window of time even though the system could not attain an actual time of day value. A legacy system that does not employ the techniques described herein would power up without a battery backed RTC and start time stamping files with the system time elapsed since the "zero" time of the system such as Jan. 1, 1980 00:00:00 time. Whereas a system with the Aggregated Time will boot between windows of knowing the actual real time, and still stamp files such that they can be discovered by searching within the windows of real time.

Persistent or nonvolatile memory 420 is used to store network time records and power time records that are used by the timestamp logic 440 to generate and compare timestamps. If all or part of computer-readable media 404 includes persistent memory, then persistent memory 420 may be included in computer-readable media 404.

Electronic processing device 400 also includes input interface(s) 416 and output interface(s), which are any now known or later developed physical or logical elements that facilitate receipt of input and output, respectively, to electronic processing device 400.

Network interface(s) 410 represent one or more physical or logical elements, such as connectivity devices or computer-executable instructions, which enable communication between electronic processing device 400 and external devices or services, via one or more protocols or techniques. Such communication may be, but is not necessarily, client-server type communication or peer-to-peer communication. Information received at a given network interface may traverse one or more layers of a communication protocol stack. Among other things, the information provided to the electronic processing device 400 over the network interface(s) 410 is a reference time that is available when the device 400 is in communication with a suitable network.

Session clock 430 includes circuitry for maintaining chronological time whenever the device 40 is powered up. Session clock 430 does not include a backup source of power such as a battery or capacitor and therefore does not maintain time when the device is powered off. Session clock 430 could be implemented as software maintaining chronological time using standard monotonic hardware clocks or even standard CPU timers.

Specialized hardware 442 represents any hardware or firmware that implements functions of the electronic processing device 400. Examples of specialized hardware include encoder/decoders, hardware assisted encryption/decryption functions, application-specific integrated circuits, and the like.

It will be appreciated that particular configurations of electronic processing device 400 may include fewer, more, or different components or functions than those described. In addition, functional components of electronic processing device 400 may be implemented by one or more devices, which are co-located or remotely located, in a variety of ways. Functions/components described herein as being computer programs are not limited to implementation by any specific embodiments of computer programs Rather, such functions/components are processes that convey or transform data, and may generally be implemented by, or executed in, hardware, software, firmware, or any combination thereof.

Figure 4:
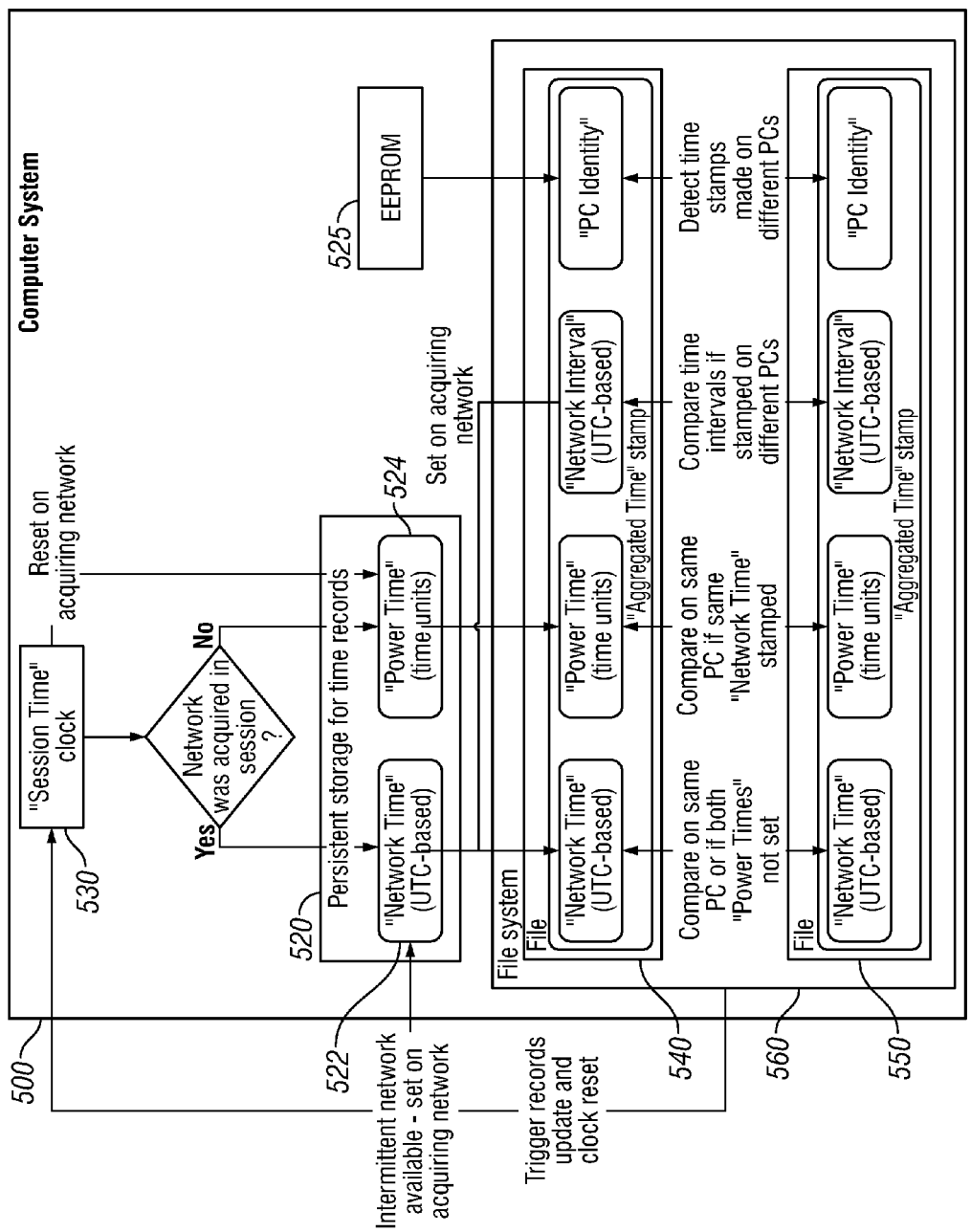
FIG. 4 is a simplified schematic diagram illustrating how the session clock and the memory components of the device shown in FIG. 3 may be used to generate and compare timestamps.

FIG. 4 is a simplified schematic diagram illustrating how the session clock and the memory components of the device 400 in FIG. 3 may be used to generate and compare timestamps. In this example the device 500 utilizes session clock 530, which employs resettable battery-less clock circuitry, to maintain the session time while the device is powered up. The device maintains a network time record in persistent memory 520. The network time record 522, which represents the last known reference time, is registered when a timestamp for an event is requested and generated. In addition, the system also maintains a power time record 524 in persistent memory 520. The power time record 524 represents the accumulated operational time spent by the device with no access to a reference time. As with the network time record 522, the power time record 524 is registered when a timestamp for an event is requested and generated.

Once a network connection is acquired in a session, the session clock 530 and the power time record 524 are reset and the network time record 522 is set. If the connection should be lost and regained during the session, no action is taken since the reference time has already been acquired and maintained throughout the session. All events such as creation of files 540 and 550, for example, are stamped with the aggregated time, regardless of whether or not the current network time is available. As shown in FIG. 4, whenever a timestamp is requested, the accumulated session time recorded by session clock 530 is added to either the network time record 522 (if a reference time was ever acquired during the session), or to the power time record 524. In addition, the session clock 530 is reset, and the refreshed network time record, along with power time record 524, are used to generate the aggregated timestamp. The device ID is stored in a read-only memory (ROM) such as EEPROM 525.

Whenever a network is acquired, the file system 560 scans through all files stamped with an aggregated time having the power time field set (indicating that the stamp was made while a reference time was not available) and stamps the current network time record into the network interval field to denote the end of the smallest known reference-based time interval during which the stamp was made. The difference between the network interval and the network time values represents the duration of the known timeframe during which the stamp was generated; the smaller the timeframe, the more likely it is that a comparison of timestamps generated on different systems will be resolved. As previously mentioned, a comparison of timestamps generated on the same device will generally be resolved.

In some situations it may not be necessary to use the concept of aggregated time in order to track the chronological order and issue timestamps of events that occur in a PC or other electronic processing device without the use of a RTC with battery backup. In particular, in those situations where network time is guaranteed to be obtained sooner or later, a concept referred to herein as fixable time may be employed. Fixable time is particularly efficient in systems where access to network has high intermittency, but is available most of the time, in which case a comparison of timestamps will be resolved most of the time.

When fixable time is employed, the operating system or other software resident on the device provides the usual network-based (e.g., UTC) timestamp, which is once again referred to as network time. The value for network time remains invalid (empty) if the network was not available when the stamp was generated. For each generated empty time stamps that is empty, auxiliary information is included in the timestamp which enables the timestamp to be fix upon acquiring a network. When network time next becomes available, the operating system or other software uses the acquired network time value along with the auxiliary information to fix up all the empty timestamps by setting accurate time values retrospectively.

Fixable time includes both network time and auxiliary information, which is referred to herein as service data. When the network time is available, a timestamp is generated with the usual network time. However, when network time is not available, a timestamp is generated with the network time unset (empty) and with the service data set, which allows the timestamp to be fixed at a later time when the network time becomes available. The Service Data includes three attributes: session time (in time units), session ID (session identity) and system ID (system identity). The session time refers to the amount of time spent in the current session. The session ID is a unique identity for the session and the system ID is a unique identity for the system.

As with aggregate time, the concept of fixable time may be used by a device that utilizes resettable battery-less clock circuitry. The clock is used to determine the session time since the last reset. The device maintains non-persistent network time records that represent network time, if available. If the network time is not available in the current session, the network time record is not set. The device also maintains non-persistent session time records which represents the time the device spent in the current session Once a network connection is acquired during a session, the session time that has accumulated is added (e.g., flashed) to the session time record and the session time clock is reset. In addition, the network time record is set. If the network connection is subsequently lost and regained during the session, no action is taken since a network time record has already been acquired and maintained throughout the session via the processing in the next bullet. The system uses the network time record to stamp all files at all times, whether the current network time is available or not. Whenever a timestamp is requested, the accumulated session time is added to the network time record if a network connection was ever acquired in the session. The accumulated session time is also unconditionally added to the session time record and the session time clock is reset. The refreshed network time record, along with session time record, are used to generate the timestamp and, if necessary, to generate and add service data to the stamp (the latter is not a part of the time representation—the time in the timestamp is represented by a value in conventional time units).

Whenever a network is acquired, the file system (see FIG. 5 below) scans through al files having a timestamp in which the network time is unset (empty), which indicates that the timestamp was made while a network time reference was not available. Those timestamps having an unset network time and if it was generated on the same system and in the same session (as indicated by the session data included with the timestamp) the time value for those timestamps are fixed using the following formula:

Time=<current network time>−(<Current Session Time>−<session time specified in the service data>)

This equation provides the actual time because the expression in parenthesis represents how long ago a timestamp with an empty or unset network time was made. In this way the exact time when the timestamp was generated can be reconstructed.

The manner in which timestamps are generated in terms of fixable time will be illustrated once again using the timeline shown in FIG. 1. The process is illustrated in Table 4. The fixable timestamp is represented using the following notation: Ti=network timestamp; service data={session time, session ID, system ID}

TABLE 3

| CHRONOLOGICAL TIME | FIXABLE TIME STAMP | COMMENTS |
|---|---|---|
| Hour 2 | | First boot. The network was never acquired by the current device at any previous time |
| Hour 2.5 | T1 = 0<br>SD = {0.5, 1, 1} | |
| Hour 3 | | The network is acquired and time stamp maintenance is triggered for network timestamp T1 since it is unset.<br>T1 (fixed) = 2.5 (This is the current chronological time (3 hours) less the difference between the current session time (1 hour) and the session time in the session data record (0.5 hours) |
| Hour 3.5 | T2 = 3.5 | |
| Hour 4.5 | T3 = 4.5 | The absence of the network is irrelevant since network time has already acquired and is maintained by the session time clock in the device (which is only operational when the device is powered up) |
| Hour 5.5 | T4 = 5.5 | |
| Hour 6.5 | T5 = 6.5 | The absence of the network is irrelevant since reference time has already acquired and is maintained by the session time clock in the device |
| Hour 9.0 | | Second device boot to start session 2. The network is not available |
| Hour 9.5 | T6 = 0<br>SD = {0.5, 2, 1} | |
| Hour 12.0 | | Third device boot to start session 3. The network is still not available |
| Hour 12.5 | T7 = 0<br>SD = {0.5, 3, 1} | |
| Hour 13.0 | | The network (and thus the current reference time) is acquired. Timestamp maintenance is triggered for those timestamps having an unset network time<br>T6 (fixed) = 0 - This time cannot be fixed (ever) because, as the session ID indicates, it was stamped in a previous session in which the network time was never acquired<br>T7 (fixed) = 12.5 - (This is the current chronological time (13 hours) less the |

TABLE 3-continued

| CHRONOLOGICAL TIME | FIXABLE TIME STAMP | COMMENTS |
|---|---|---|
| | | difference between the current session time (1 hour) and the session time in the session data record (0.5 hours) |
| Hour 13.5 | T8 = 13.5 | |
| Hour 14.5 | T9 = 14.5 | |

Fixable timestamps can be compared in the usual way (i.e. the greater of two timestamp values represents a later time). Such a comparison can only be performed if both timestamps are set. If either of two timestamps are not set, the comparison is not resolved.

Figure 5:
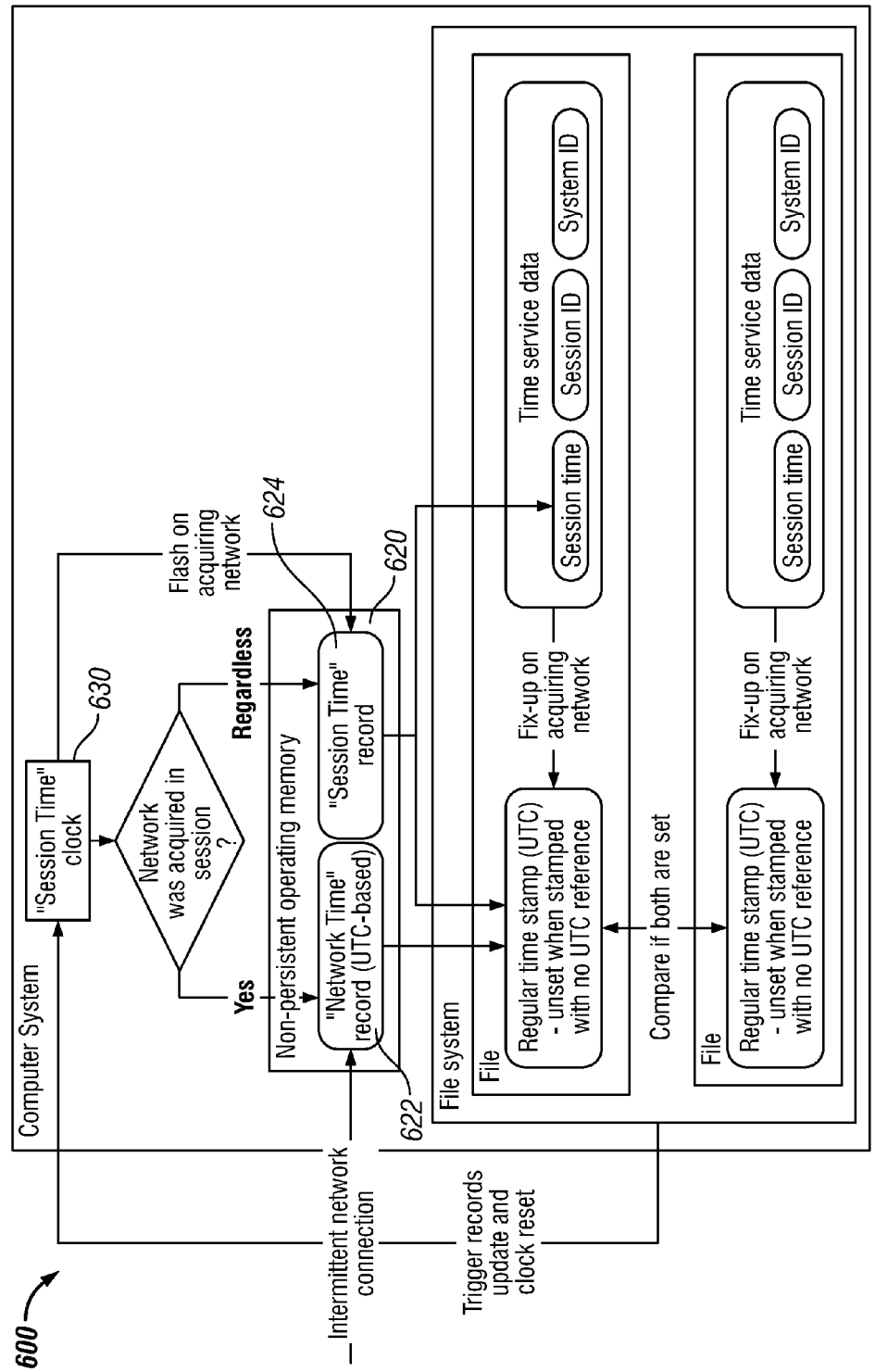
FIG. 5 is a simplified schematic diagram similar to FIG. 4 illustrating how the session clock and the memory components of the device 400 in FIG. 3 may be used to generate and compare timestamps when fixable time is employed.

FIG. 5 is a simplified schematic diagram similar to FIG. 4 illustrating how the session clock and the memory components of the device 400 in FIG. 3 may be used to generate and compare timestamps when fixable time is employed. In this example the device 600 utilizes session clock 630, which employs resettable battery-less clock circuitry, to maintain the session time while the device is powered up. The device maintains a network time record in non-persistent memory 620. The network time record 622, which represents the last known reference time, is registered when a timestamp for an event is requested and generated. In addition, the system also maintains a session time record 624 in non-persistent memory 620. The session time record 624 represents the amount of time spent in the current session. As with the network time record 622, the session time record 624 is registered when a timestamp for an event is requested and generated.

It will be understood that when one element or component in FIG. 3 or 4 is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. An electronic processing device comprising:
a processor;
a network interface configured to communicate with at least one external device;
a system bus communicatively coupling the network interface and the processor;
a session clock operably coupled to the processor, the session clock having circuitry that maintains chronological time when the electronic processing device is powered;
computer readable media communicatively coupled to the processor, the computer readable media storing computer-executable instructions that include an operating system, which when executed by the processor, control operation of the electronic processing device;
persistent memory operably coupled to the processor, the persistent memory storing at least one timestamp generated when a reference time was not available;
timestamp logic coupled to the processor and configured to convert timestamps, generated when a reference time was not available, to time of day timestamps once a reference time is acquired via the network interface.

2. The electronic processing device of claim 1, wherein the persistent memory is included in the computer readable media.

3. The electronic processing device of claim 1, wherein the timestamp logic is adapted to generate a timestamp and store the timestamp in the persistent memory.

4. The electronic processing device of claim 3, wherein the timestamp includes:
information indicative of a most recent time when a reference time was acquired by the electronic processing device via the network interface;
an amount of time that begins with a session following a most recent session in which the reference time was acquired;
a time at which the reference time was acquired after a timestamp was generated when the reference time was not available; and
a system identifier.

5. The electronic processing device of claim 1, wherein the timestamp logic is adapted to compare a plurality of timestamps stored in the persistent memory.

6. The electronic processing device of claim 1, wherein the processor is configured by the computer-executable instructions stored in the computer readable media to trigger a timestamp maintenance operation that updates at least one timestamp stored in the persistent memory once a reference time becomes available.

7. The electronic processing device of claim 1, wherein the session clock includes resettable battery-less clock circuitry for maintaining non-persistent time records.

8. The electronic processing device of claim 7, wherein the session clock is implemented in a timer of the processor.

9. The electronic processing device of claim 1, wherein the session clock is implemented in software.

10. The electronic processing device of claim 1, wherein the timestamp logic is configured to calculate time of day timestamps based on the reference time and an amount of time that has elapsed since each respective timestamp was generated while the reference time was not available.

11. The electronic processing device of claim 1, wherein the at least one timestamp is a file creation timestamp.

12. The electronic processing device of claim 1, wherein the reference time is acquired via the network interface using communication in accordance with network time protocol.

13. The electronic processing device of claim 2, wherein the reference time is acquired via the network interface using communication in accordance with simple network time protocol.

14. A computer-implemented method of storing timestamp information, the method comprising:
- booting a device having a session clock at a time when the device does not have a network connection;
- generating and storing a time record for an event while the device does not have a network connection, the time record including a value generated from the session clock;
- establishing a network connection with the device and causing the device to obtain a reference time; and
- after obtaining the reference time, using the reference time to update the stored time record to generate a real time value for the time record to indicate a real time of the event.

15. The computer-implemented method of claim 14, wherein the session clock is a resettable battery-less clock.

16. The computer-implemented method of claim 14, wherein the event is a file creation event.

17. The computer-implemented method of claim 14, and further comprising comparing a plurality of time records stored while the device does not have a network connection.

18. The computer-implemented method of claim 14, wherein the updated time record is stored in persistent memory of the device.

19. The computer-implemented method of claim 14, wherein causing the device to obtain a reference time includes communicating with a remote device through the network connection.

20. The computer-implemented method of claim 19, wherein the communication with the remote device is in accordance with the network time protocol.

21. The computer-implemented method of claim 19, wherein the communication with the remote device is in accordance with the simple network time protocol.

* * * * *